United States Patent [19]
Geraci et al.

[11] 3,985,317
[45] Oct. 12, 1976

[54] SHORT COUPLED AIRPLANE WITH VARIABLE WING LIFT

[76] Inventors: Alexander Geraci, 5221 N. Lind Ave., Chicago, Ill. 60630; Joseph DeLouise, 6 E. Monroe St., Chicago, Ill. 60606

[22] Filed: Jan. 31, 1975

[21] Appl. No.: 545,971

[52] U.S. Cl. ............................. 244/13; 244/45 R
[51] Int. Cl.² ................................... B64C 3/06
[58] Field of Search .......... 244/45 R, 45 A, 42 CC, 244/35 R, 13, 87, 54; D12/77, 78, 71

[56] References Cited
UNITED STATES PATENTS

| | | | |
|---|---|---|---|
| 1,861,491 | 6/1932 | Capelis | 244/13 |
| 1,895,140 | 1/1933 | Stage | 244/45 R |
| 1,927,753 | 9/1933 | Porcello | 244/13 |
| 2,151,128 | 3/1939 | Looney | 244/45 R |
| 2,406,625 | 8/1946 | Oglesby | 244/45 R |
| 2,713,465 | 7/1955 | Novinger | 244/45 R |
| 3,202,383 | 8/1965 | Le Bel et al. | 244/42 CC |
| D185,546 | 6/1959 | Geraci | 244/45 R X |

FOREIGN PATENTS OR APPLICATIONS

| | | | |
|---|---|---|---|
| 1,141,371 | 9/1957 | France | 244/45 R |

OTHER PUBLICATIONS
Saab TN 60, "Basic Low Speed Aerodynamics of the Short Coupled Canard Configuration of Small AR" Behrbohm, July 1965.

*Primary Examiner*—Trygve M. Blix
*Assistant Examiner*—Galen L. Barefoot
*Attorney, Agent, or Firm*—Mann, Brown & McWilliams

[57] ABSTRACT

A short coupled airplane with variable wing lift comprising a fuselage that is free of the conventional tail assembly and has a wing structure comprising a plurality of short span wing segments spaced apart longitudinally of the fuselage with the forwardmost wing section being located forwardly of and above the level of the aircraft center of gravity, and the rearwardmost wing section being located rearwardly of, and below the level of the aircraft center of gravity. The wing sections at their projecting ends on either side of the airplane are connected by vertical airfoils each equipped with a rudder. The wing sections along their trailing edges are each equipped, on either side of the fuselage, with full span, vertically swingable members that combine the functions of flaps and elevators (and are thus called eleflaps). The eleflaps and rudders are respectively moved in unison to elevate, lower, and steer the aircraft. The aircraft is driven pusher style by a propeller driven motor located in vertical alignment with the aircraft center of gravity.

13 Claims, 10 Drawing Figures

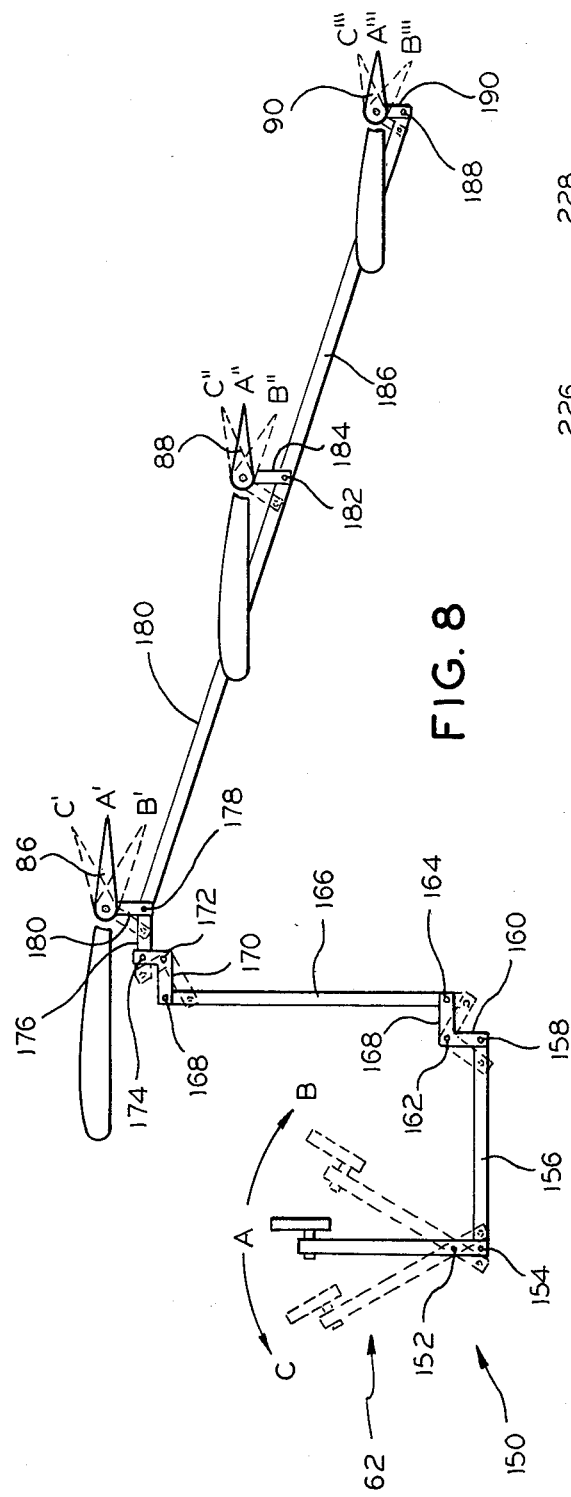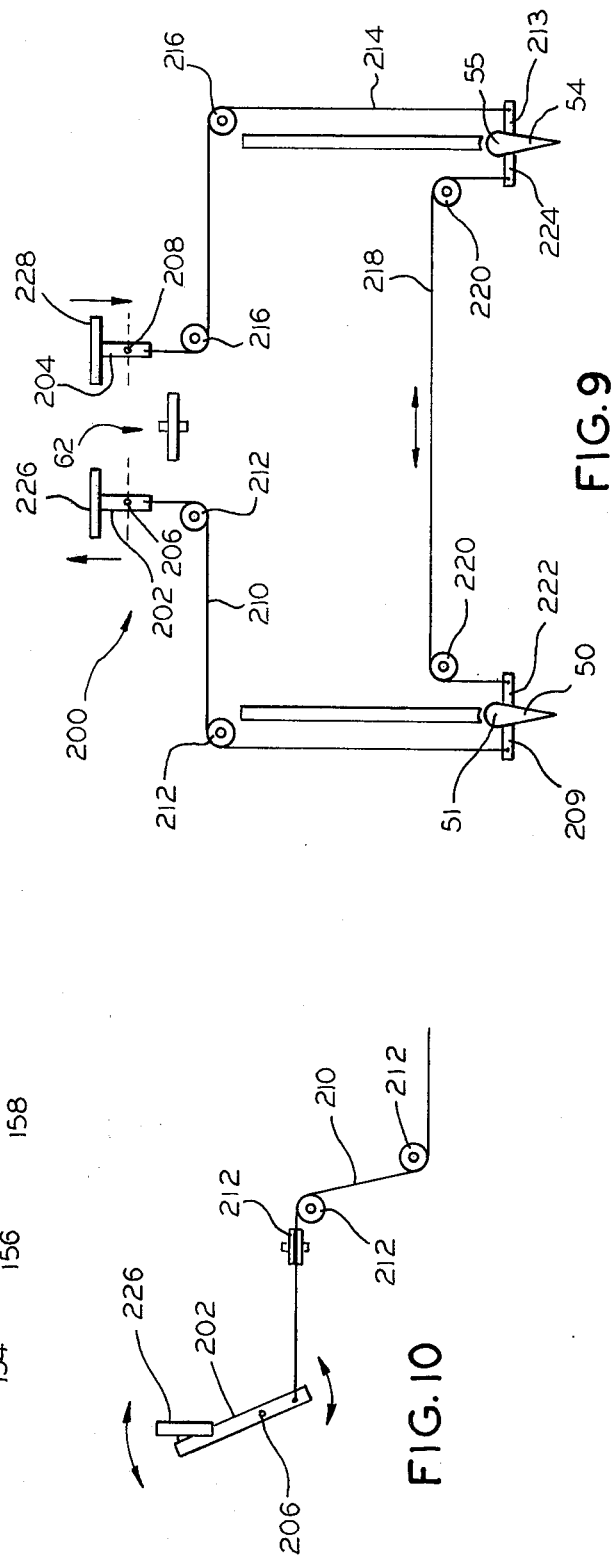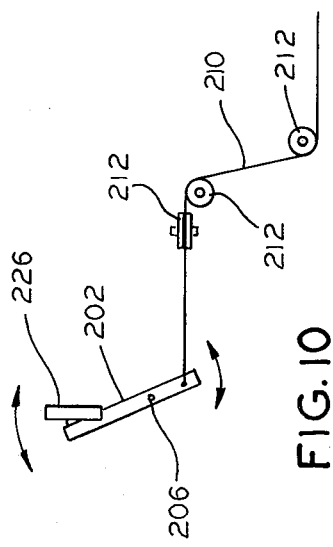

SHORT COUPLED AIRPLANE WITH VARIABLE WING LIFT

This invention is directed to powered aircraft, and more particularly to propeller driven airplanes.

Conventionally, propeller driven airplane design calls for a fuselage equipped with wings having a large span relative to their chord, with the average ratio of span to chord being about 7. The wings are equipped adjacent their ends with ailerons which are operated cooperatively so that an upward movement of one aileron is accompanied by a downward movement of the other aileron; they are operated by sideways movement of the pilot's control column, and are the means by which the wings are kept level for straight flight, or banked for a turn. The wings also include, inwardly of the ailerons, lift control flaps that swing in the same direction vertically to permit fast planes to land at slower speeds and to take off in shorter distances.

The fuselage of conventional airplanes traditionally is equipped at its rear end, usually at a distance of some three chords behind the leading edge of the wings, with a tail assembly, usually including a vertical stabilizer equipped at its trailing edge with the rudder, and a horizontal stabilizer equipped at its trailing edge with an elevator. The vertical stabilizer provides for vertical stabilization and the rudder it carries is for directional steering. The horizontal stabilizer balances or trims the plane, that is, insures that the resultant of all the air forces acting on the plane passes through the center of gravity of the plane. The elevator is the primary control organ of the plane since by it the pilot alters the angle of incidence of the wings and hence controls the plane speed.

The design specified for a particular airplane construction is fundamentally a compromise between its cruising speed and its landing speed. Usually a fast cruising airplane lands fast and a slow cruising airplane lands slow. The use of flaps on the airplane wings is to provide for fast planes to land at a reduced speed, and also to take off in a shorter distance than might otherwise be possible. However, such flaps add to the cost and weight of the airplane, and usually create a disturbing air flow over the aircraft tail section when lowered for landings, which requires an enlargement of the tail section to offset this effect, again adding to the cost and weight problems involved. Furthermore, in most standard type of airplanes, much of the fuselage is located aft of the aircraft center of gravity, and the major function of that portion of the fuselage is to carry the tail assembly. Thus, much of the fuselage defines wasted space since any significant loading up towards the tail assembly would make the aircraft tail heavy.

A principal object of the present invention is to provide an airplane arrangement that climbs and descends in a level or near level attitude, and has stability characteristics that are markedly improved over those of conventional airplanes.

Another principal object of the invention is to provide an airplane arrangement, utilizing components historically known to be reliable in the practice of aerodynamics, which minimizes controls to be handled while providing an aircraft of greatly improved maneuverability and stability.

Another important object of the invention is to eliminate the need for the usual tail assembly and adapt the airplane and fuselage for location of baggage or cargo space at or near the center of gravity of the aircraft.

Still other objects of the invention are to provide an airplane arrangement adapted for pusher propulsion with its attendant efficient slipstream freedom and quietness and safety of operation, to provide an airplane vertical airfoil arrangement that reduces the need to "crab" when landing in a cross wind, to provide a basic airplane arrangement susceptible of wide utilization, and to provide an aircraft that is economical of manufacture, convenient, economical, and safe to operate, and that is adapted for a wide variety of both civilian and military purposes, and that is also spin proof.

In accordance with the invention, the airplane fuselage is short coupled and has no tail assembly. The wing structure comprises a plurality of short span wing sections that are spaced apart longitudinally and vertically of the fuselage, with the forwardmost wing section being located forwardly of the craft center of gravity and adjacent the top level of the craft, and the rearwardmost wing section being located rearwardly of the center of gravity and sufficiently below the wing sections forward of it to be below their slipstreams. The wing sections along their trailing edges are each equipped, on either side of the fuselage, with vertically movable members that combine the functions of elevators and flaps, (and are thus herein called eleflaps), which members function not only to increase and decrease the wing lift, but also to control vertical movement of the craft. The wing sections at their ends or tips, on either side of the airplane, are connected together by vertical airfoils that are each equipped with a rudder for steering purposes.

The eleflaps serve the functions of flaps, ailerons and elevators, and provide for vertical movement of the craft in a level or near level attitude. The vertical airfoils serve as the craft vertical stabilizers, and are proportioned and located to achieve lateral plane movement in cross winds that permits cross wind landing with minimal crabbing. The rudders are arranged to operate in unison to achieve turns in flight.

Other objects, uses and advantages will be obvious or become apparent from a consideration of the following detailed description and the application drawings in which like reference numerals indicate like parts throughout the several views.

In the drawings:

FIG. 8 is a diagrammatic illustration of an articulated linkage control arrangement for actuating the eleflaps of the embodiment of FIGS. 6 and 7 from the pilots control column;

Figure 1:
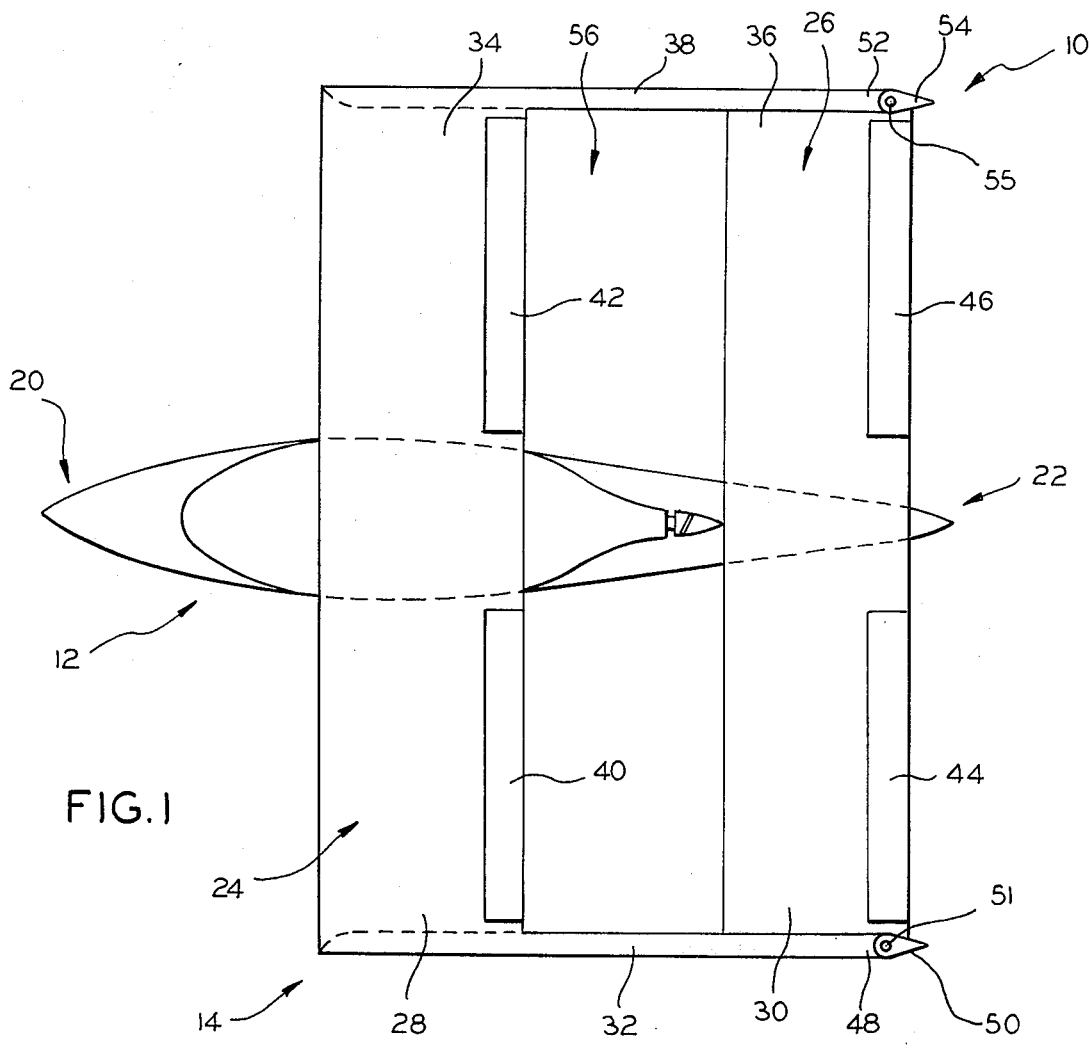
FIG. 1 is a diagrammatic plan view, largely in block diagram form illustrating one embodiment of the invention.

FIG. 9 diagrammatically illustrates a suitable rudder control arrangement for the aircraft of this invention; and FIG. 10 illustrates a detail aspect of the rudder control arrangement of FIG. 9.

However, it is to be distinctly understood that the drawing illustrations provided are supplied primarily to comply with the requirements of the Patent Laws, and that the invention is susceptible of the variations and modifications that will be obvious to those skilled in the art which are intended to be covered by the appended claims.

Figure 2:
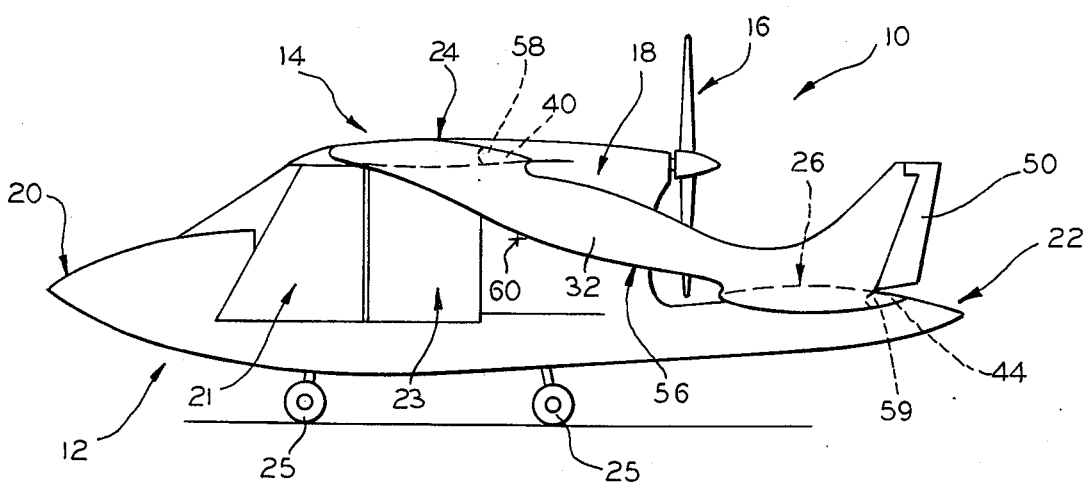
FIG. 2 is a side elevational view of the aircraft shown in FIG. 1.

Reference numeral 10 of FIGS. 1 and 2 generally indicates one embodiment of the invention which comprises fuselage 12 equipped with wing structure 14 and a pusher type propeller 16 suitably powered by a suitable motor appropriately mounted and housed within the fuselage where indicated by reference numeral 18.

The fuselage 12 defines forward end 20 and aft end 22 that are given appropriate streamlined contour. As has been pointed out hereinbefore, the fuselage 12 lacks the usual tail assembly; it includes a suitable operator's cockpit where indicated at 21, passenger or cargo space where indicated at 23, and suitable ground support wheels 25.

The wing structure 14 is of special configuration and comprises a forward short span wing section 24 and a rearward or aft short span wing section 26 suitably united with the fuselage in any conventional manner consistent with good engineering practice. On either side of the aircraft, the end 28 of wing section 24 is joined to the end 30 of wing section 26 by vertical airfoil 32, and the end 34 of wing section 24 is joined to the end 36 of wing section 26 by vertical airfoil 38.

The wing section 24 on either side of the aircraft is equipped with full span vertically movable eleflaps 40 and 42, while the wing section 26 is similarly equipped with full span vertically movable eleflaps 44 and 46.

The vertical airfoil 32 at its trailing end 48 is equipped with horizontally movable rudder 50 suitably pivotally mounted for movement about upright axis 51, while the airfoil 38 at its trailing end 52 is equipped with horizontally movable rudder 54 suitably pivotally mounted for movement about upright axis 55.

The wing sections 24 and 26 may be of essentially conventional wing design except for the short span and other considerations indicated. Wing section 26 is disposed approximately one wing chord aft of the wing section 24, so that a gap 56 is defined by the wing sections 24 and 26 making up the wing structure 14. Wing section 26 is also at a level below that of wing section 24 that is equivalent to approximately one half wing chord.

The eleflaps 40, 42, 44 and 45 may be constructed and mounted in the same manner as conventional elevators or flaps. Wing section 24 is located forwardly of the aircraft center of gravity, indicated at 60 in FIG. 1-5, with the eleflaps 40 and 42 of the wing section 26 being disposed above the center of gravity in the embodiment shown and mounted for pivotal swinging movement about pivot axes 58 (see FIGS. 3 and 4) that extend longitudinally of wing section 26; eleflaps 44 and 46 are suitably mounted for pivotal movement about axes 59 that extend longitudinally of wing section 26. The eleflaps 40, 42, 44, and 46 are connected for actuation from the pilot's control column 62 in such a manner (see, for instance, FIG. 8) that they operate in unison, and all eleflaps move in the same direction. It is also important that the aft eleflaps 44 and 46 move to a lesser degree than the forward eleflaps 40 and 42 because of their greater distance from the center of gravity 60 of the craft.

As a general proposition, in accordance with this invention, the forwardmost wing section should be located so that its eleflaps are disposed above or forwardly of the aircraft center of gravity. Also, the vertical swinging movement of the respective eleflaps is approximately inversely proportional to the distance of the respective eleflap centers of movement forward or aft of the craft center of gravity. Thus, where the forwardmost eleflap is located in substantial vertical alignment with the craft center of gravity, such eleflap will have maximum vertical movement and the rearward eleflap will have a vertical movement inversely proportional to the distance of its axis of movement aft of the center of gravity.

Figure 3:
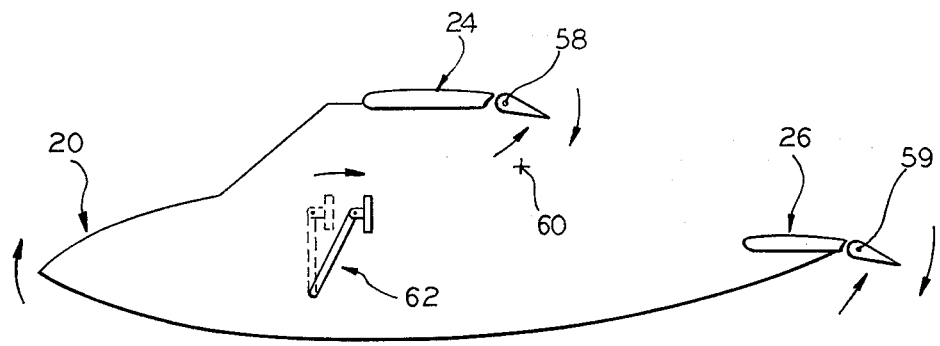
FIGS. 3 and 4 are diagrams illustrating the manner in which the craft eleflaps are operated to move the aircraft vertically.
Figure 4:
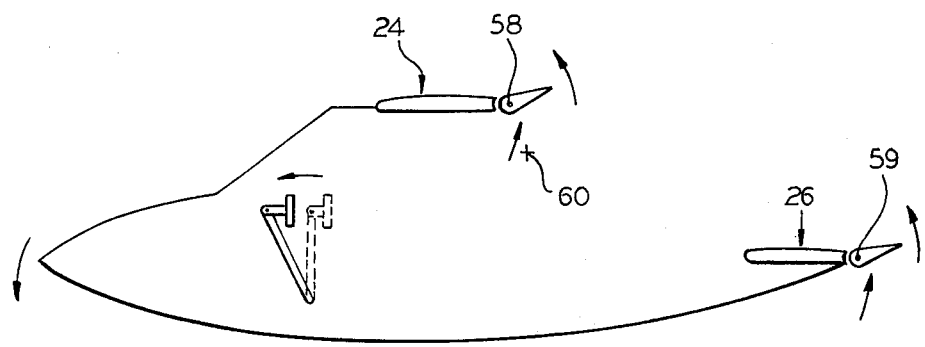

The actuation of the eleflaps 40, 42, 44 and 46 is made that when the pilot's control column is moved rearwardly, as indicated in FIG. 3, the eleflaps 40, 42, 44 and 46 are lowered about their respective pivotal axes. Since the forward eleflaps 40 and 42 are substantially aligned with the craft's center of gravity, longitudinally of the aircraft, when such eleflaps are moved downwardly the result is that the forward end or nose 20 of the aircraft is caused to rise, as indicated in FIG. 3. At the same time, similar movement of the eleflaps 44 and 46 tends to cause the forward end or nose of the aircraft to move downwardly. The lesser degree of movement of the rearward eleflaps 44 and 46 is needed because of their distance from the center of gravity longitudinally of the aircraft, whereby they provide a greater moment in effecting the attitude of the aircraft.

Where the control column 62 is moved forwardly, as when descending, the forward wing section eleflaps 40 and 42 move upwardly thereby causing the nose of the aircraft to move downwardly (as indicated in FIG. 4), while the wing section eleflaps 40, and 46 move upwardly tending to cause the aircraft nose to move upwardly.

It will thus be seen that there is a critical ratio of forward wing span eleflap movement to rearward wing span flap movement, in unison, relative to the craft center of gravity, which controls the attitude of the longitudinal axis of the aircraft. This ratio can be set or adjusted to give the aircraft a desired attitude when climbing or descending. Preferably the ratio selected will provide a slight nose up attitude when climbing and slight nose down attitude when descending, from the standpoint of safety, efficiency and effectiveness.

The further back the control column 60 is moved, the greater is the increase that is provided in the lift of both wing sections for climbing in a level or near level attitude, while when the control column is pushed forward, both wing sections lose lift and the aircraft descends in a level or near level attitude.

The rudders 50 and 54 are similarly controlled by pilot operated foot pedals to move in unison in the same direction. The rudders 50 and 54 are suitably mounted for pivotal movement about axes 51 and 55 that are vertically disposed when the aircraft is in a level attitude, and the pivotal mounting involved may be achieved in any suitable manner consistent with good aerodynamics engineering practice. FIGS. 9 and 10 illustrate diagrammatically a suitable rudder control arrangement.

The short wing span of the aircraft 10 gives it a compact configuration. As a general proposition, in accordance with the invention the wing span may be substantially equal to or less than the length of the fuselage, and have a chord to span length ratio on the order of four to one. The wing and fuselage arrangement indicated also provides for the center of lift of the aircraft to be located one third of the distance (longitudinally of the craft) between the centers of lift of the forward and rearward wing sections (aft of the forward wing section center of left), and also to be located in substantial vertical alignment with the center of gravity 60.

Figure 5:
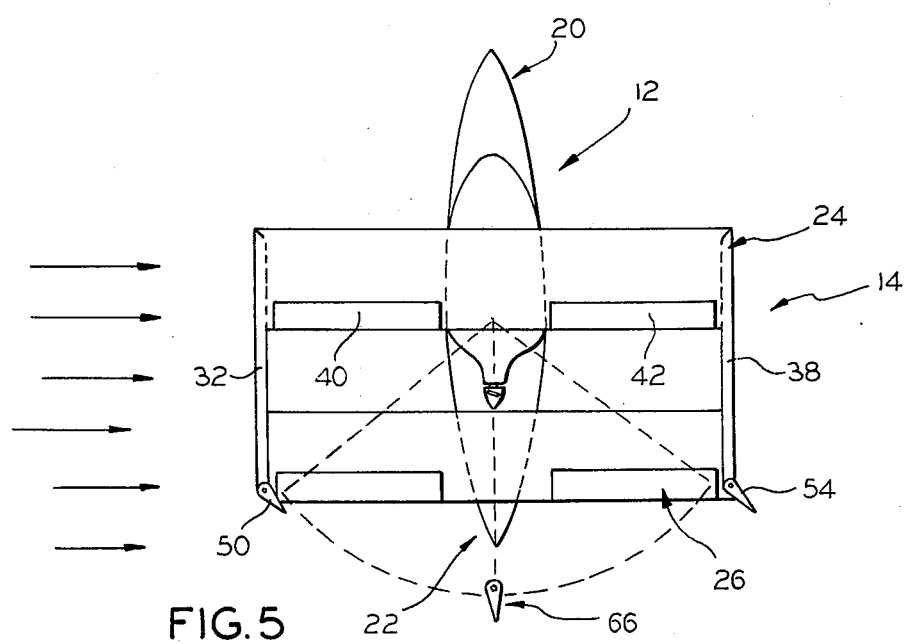
FIG. 5 is a view similar to that of FIG. 1 but on a smaller scale and diagrammatically illustrating the manner in which the rudder operate.

The general combination provided by the compact aircraft configuration, its vertical airfoils 32 and 38, and the rudder action provided permits the aircraft to make banked turns with rudder action only, thereby eliminating the need for ailerons for shorter wing span models. When the aircraft is in flight and the rudders 50 and 54 are actuated for turning purposes, for instance, a turn to the right as indicated in FIG. 5, the vertical air foils 32 and 38 prevent the aircraft from going into a skid, and the aircraft is forced into a bank, thus making a naturally banked turn. The air foils 32 and 38, in extending between the forward and rearward wing sections, do not present a proponderance of area at the rear portion of the aircraft, as does the vertical stabilizer of the usual tail assembly, while presenting a relative large effective area adjacent the craft center of gravity.

In spite of the short coupled nature of the aircraft 10, its directional stability is very good because of the placement of the rearmost wing section 26 well aft of the aircraft center of gravity, and also because of the disposition of the wing structure 14 and airfoils 32 and 38 to either side of the aircraft at the ends of the wing sections.

The result is that when the aircraft experiences wind from one side of same, fishtailing is avoided and application of moments to the fuselage is also avoided because the tail assembly is omitted from the aircraft 10. The two rudders 50 and 54 when operated provide an effective moment for steering purposes that is equivalent to the location of a single rudder where indicated by reference numeral 66 in FIG. 5.

Figure 6:
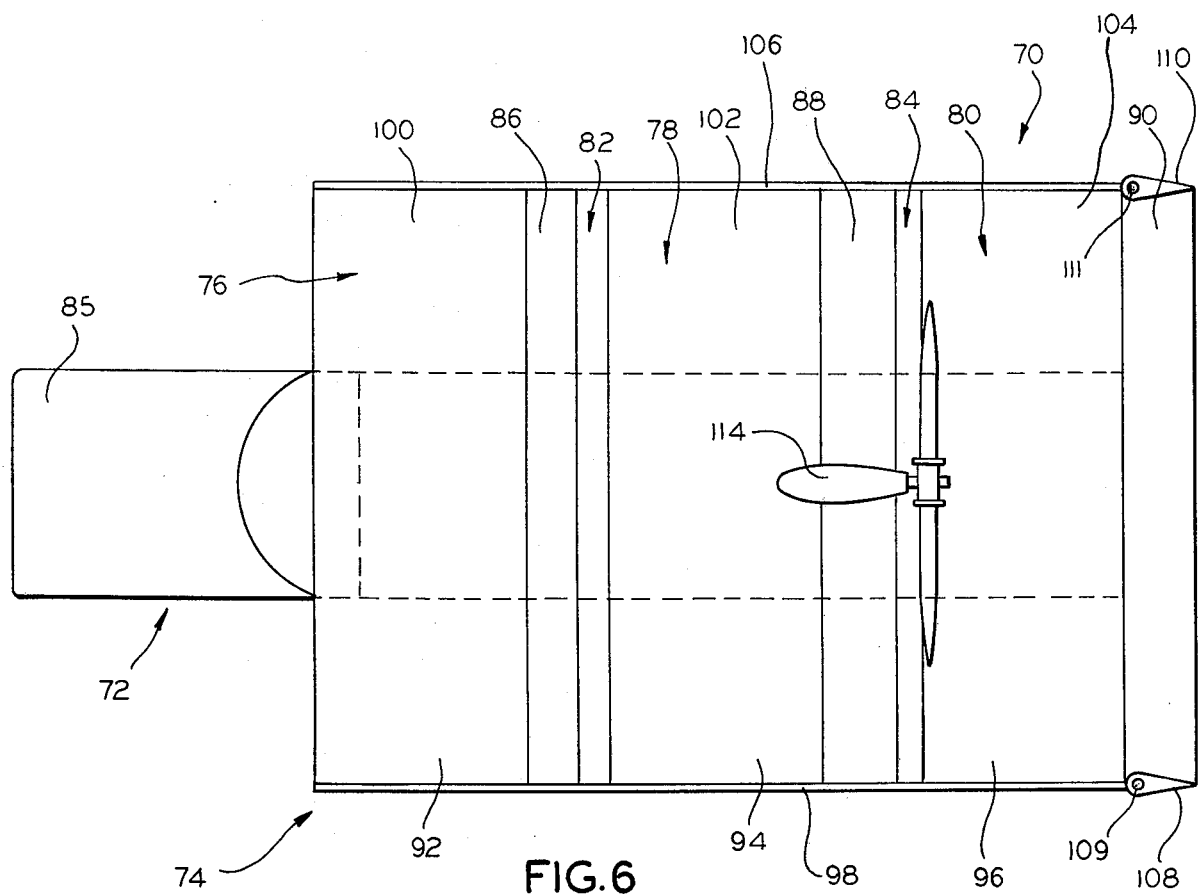
FIG. 6 is a plan view of a modified form of the invention.
Figure 7:
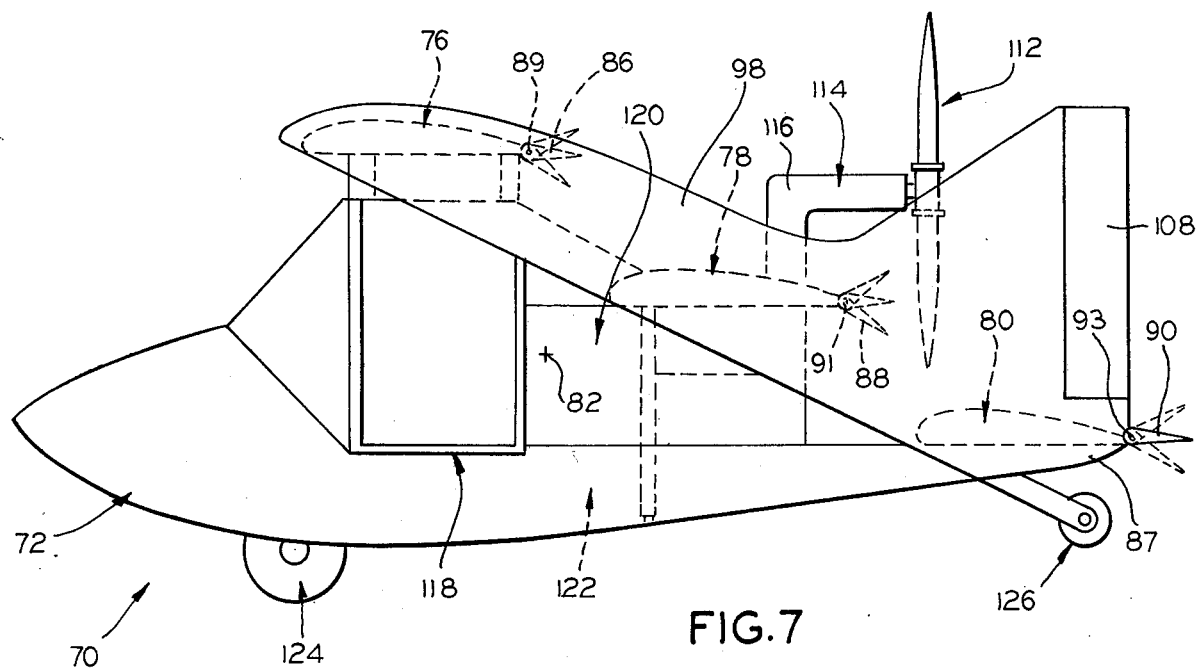
FIG. 7 is a side elevational view of the aircraft shown in FIG. 6.

In aircraft 70 of FIGS. 6 and 7, the fuselage 72 is provided with wing structure 74 that comprises a plurality of wing sections 76, 78 and 80 in which the forwardmost wing section 76 is located forwardly of the aircraft center of gravity (indicated at 82) while the rearwardmost wing section 80 is spaced rearwardly or aft of the aircraft approximately two wing chords. The wing section 76 is disposed at the upper level of the aircraft while the wing sections 78 and 80 are disposed at spaced levels below the level of the section 76, as suggested in FIG. 7. Gap 82 separates wing sections 76 and 78 while gap 84 separates wing sections 78 and 80. Fuselage has nose portion 85 and tail portion 87, but no tail assembly of the conventional type.

Wing section 76 is provided with a full span eleflap 86, wing section 78 is provided with a full span eleflap 88 and wing span section 80 is provided with a full span eleflap 90. Eleflaps 86, 88 and 90 may be comparable in structure to conventional elevators and flaps and mounted and controlled in the manner already indicated with respect to the aircraft 10, so as to pivot about the respective pivot axes 89, 91 and 93.

The wing sections 76, 78, 80 at their ends 92, 94 and 96 are connected together by vertical foil 98 while wing section ends 100, 102 and 104 are connected together by vertical foil 106. Vertical foil 98 is provided with rudder 108 at its trailing end, mounted for pivotal movement about upright axis 109, while vertical foil 106 is provided with rudder 110 at its trailing end, mounted for pivotal movement about upright axis 111. Rudders 108 and 110 are mounted and operated in a manner comparable to rudders 50 and 54 of aircraft 10.

The aircraft 70 is provided with suitable propeller 112 driven by a suitable motor (not shown) suitably mounted and housed within the fuselage approximately where indicated at 114, through suitable shafting and gearing operating in housing structure 116 that in the form shown extends through the wing section 78.

The fuselage 72 is suitably arranged and constructed to define the usual operator's cockpit where indicated at 118, a fuel tank where indicated at 120, and baggage compartment where indicated at 122. The aircraft 70 is provided with suitable riding wheels 124 and 126, in the form illustrated.

In the aircraft 70, the rearward wing sections are spaced approximately one-half chord length longitudinally of the craft, and are spaced or staggered approximately one-third of a chord length vertically of the craft.

The aircraft 70 is operated in the same manner as aircraft 10. The eleflaps 88 and 90 are operated to move vertically, relative to the corresponding movement of eleflap 86, in proportion to their distances from the center of gravity of the aircraft, longitudinally of the fuselage, and as described with reference to the aircraft 10.

The vertical foils of aircraft 10 and 70 are disposed in vertical planes that parallel the longitudinal axis of the craft. These vertical foils may be of any suitable airfoil construction consistent with good aircraft engineering practice.

A typical eleflap actuation arrangement 150 is shown in FIG. 8 for the embodiment of FIGS. 6 and 7, wherein the pilot's control column 62 is shown pivotally mounted (in the craft) for pivotal movement about axis 152, and is pivotally connected as at 154 to link 156 that is in turn pivotally connected as at 158 to bell crank lever 160 pivotally mounted for pivotal movement about axis 162. Bell crank lever 160 is pivotally connected as at 164 to link 166 that is in turn pivotally connected as at 168 to bell crank lever 170 pivotally mounted for pivotal movement about axis 172. Bell crank lever 170 is pivotally connected as at 174 to link 176 that is pivotally, connected as at 178 to crank arm 180 that is fixed to eleflap 86. Link 176 is also pivotally connected at the same pivot point 178 to link 180 which in turn is pivotally connected as at 182 to crank arm 184 that is fixed to eleflap 88. Link 180 is also connected at pivot 182 to link 186 that is pivotally connected as at 188 to crank arm 190 that is fixed to eleflap 90.

As eleflap 86 is disposed above the craft center of gravity 82, crank arms 184 and 190 are given effective lengths inversely proportional to their positions aft of the center of gravity, relative to the length of crank arm 180, whereby the degree of pivotal movement of the respective eleflaps 88 and 90 has the inversely proportional relationship to the degree of pivotal movement of the eleflap 86 that has been indicated. The result is that, assuming the position A of the pilots control column 62 is the level flight position, moving the control column 62 to the B and C positions provides the corresponding positions of the eleflaps 86, 88, and 90 that are indicated by the corresponding primed letters. In the B position of control column 62 lift is increased, while in the C position of column 62, lift is decreased.

In practice, the location and positioning of the various components of eleflap control arrangement 150 is made consistent and compatible with good aircraft engineering design. A similar eleflap arrangement for the embodiment of FIGS. 1–5 is provided by eliminating the link 186 and the parts it controls, and proportioning the length of the crank arms for eleflaps 40, 42, 44 and 46 in accordance with the principles already mentioned. The link corresponding to link 180 would for the embodiment of FIGS. 1–5, have a length consistent with the positioning of the forward and aft eleflaps. Of course, the eleflaps of the respective wing sections 24 and 26 may be suitably connected together for synchronous operation by a single eleflap control arrangement of the type indicated.

Where it is found desirable to provide for operation of the eleflaps in the manner of ailerons, suitable alternately operable controls conventionally arranged may be employed.

In the showings of FIGS. 9 and 10, the rudder control arrangement 200 involves a pair of foot operated pedal levers 202 and 204, pivotally mounted as at 206 and 208, respectively, and disposed on either side of the control column 62. Lever 202 is connected to crank arm 209 of rudder 50 by cable 210 trained about suitable guide pulleys 212, while lever 204 is connected to crank arm 213 of rudder 54 by cable 214 trained about suitable guide pulleys 216. Cable 218 trained about suitable guide pulleys 220 is connected between crank arm 222 of rudder 50 and crank arm 224 of rudder 54. The cables 210 and 214 are suitably tensioned and operably mounted relative to the craft so that the pilot by moving levers 202 and 204 in opposite directions, using his feet applied to the respective pedals 226 and 228, may simultaneously swing the rudders 50 and 54 from side to side to steer the craft as needed.

Of course, other rudder controls providing for the indicated simultaneous and synchronous swinging movement of rudders 50 and 54 may be utilized, as will be apparent to those skilled in the art.

It will therefore be seen that the invention provides an aircraft of compact configuration that provides unusual stability in flight together with the advantages of level or near level attitude for both ascent and descent. The compact configuration of the aircraft together with the placement of the wing structure of same, the short spans of the wings, and the vertical foils, provides the aircraft with a pendulum effect in which the main weight of the aircraft is located adjacent or in vertical alignment with its center of gravity whereby the aircraft tends towards level attitude at all times. Even in making a turn, the aircraft has a strong tendency to return to straight and level flight and thus on release of control in making a turn the craft will return to straight and level flight.

The aircraft of this invention also overcomes the main fault of a two-control airplane, that is, the inability of such aircraft to enter into a slide slip. Not only will the aircraft of this invention not enter into a side slip, but it moves vertically in a far more superior manner.

Thus, the pilot by pushing his control column forward can make the aircraft lose altitude very rapidly without gaining any forward speed and while remaining in a level or near level attitude.

The smooth unobstructed airflow past all the control surfaces of the aircraft of this invention make the aircraft fully controllable at all speeds without added weight or drag. This especially suits aircraft involving the invention for short field landing and take-off (STOL). Most STOL aircraft at the present time involve expensive flaps, drooping ailerons, and the like to facilitate landing and take-off but result in inadequate control at the lower speeds. Because such conventional craft must operate at higher angles of attack for landings and take-off, their control surfaces operate in a disturbed airflow created by the wings and flaps and therefore their control surfaces must be much larger than in ordinary aircraft, thereby creating more weight and drag.

The wing section eleflaps provided by the invention safely control the attitude of the aircraft and without the need of extra drag producing tail surfaces. In addition, the eleflap control surfaces operate in an undisturbed air flow. As the arrangement of the present invention utilizes high lift eleflaps and short span wings, the air foils involved may be relatively thin thereby cutting down on the frontal area of the aircraft. This, in conjunction with the lack of a tail assembly, gives the aircraft of the invention a high speed potential, and quick take-off capability with low landing speeds. As altitude can be lost rapidly without gaining ground speed, side slips are unnecessary.

The absence, in the arrangement of the present invention, of the convenional tail assembly aft of the propeller adapts the Applicant's aircraft arrangement perfectly for a pusher type propulsion configuration with its attendant efficient slip stream freedom and quietness and safety of operation. Due to the operation of pusher type propulsion in the hereindisclosed arrangement, torque is absent in the applicant's arrangement thereby eliminating the need for a twist in the wings or offset vertical stabilizers.

The arrangement of this invention makes a large passenger or cargo space at or adjacent the center of gravity of the aircraft, thereby permitting greater loads to be carried with ease and in greater safety.

The positioning of the rearward or aft wing sections of the craft relative to the forward wing sections, improves the lift to drag ratio of the forward wing sections due to the fact that low pressure areas along the upper surfacing of the rearward wings tend to draw air from the trailing edge of the immediately preceding wing section, thus straightening out the wing edge vortices and reducing the drag resulting from such vortices. As a result, the positioning of the wing sections as indicated provides a total wing lift that is greater than the summation of the lift provided by each wing section if same were considered functioning independently.

The vertical airfoils, in having a substantial area of same adjacent the center of gravity of the craft, and thus the center of lift, provide for a lateral movement of the aircraft in crosswinds, which avoids or reduces crabbing needed for landing in crosswinds. The vertical air foils also confine air flow to through the gaps between the wing sections, thereby contributing further to wing tip vortex reduction. Also, air flow is blocked, by the vertical air foils, from up around the wing tips.

Of course the visibility afforded the pilot from the cockpit, due to the pusher type propulsion employed, and the ease of entering and leaving the aircraft due to easier access permitted to the cockpit and personnel quarters of the craft, are welcome features of the Applicant's arrangement.

The Applicant's arrangement has wide applicability for use in sport planes, cargo planes, crop dusting planes, executive planes, and has many other capabilities in the civilain field. Military operations are also immediately apparent. The special configuration of the Applicant's arrangement lends the Applicant's invention to embodiment in amphibious aircraft.

The short wing span on the aircraft of Applicant's invention permits the aircraft to be much lighter in weight than conventional aircraft of a comparable type.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

We claim:

1. In an aircraft including a fuselage having a wing structure and power means for propelling same, the improvement wherein:
   said wing structure comprises:
   a plurality of wing sections of substantially equal lengths and wing chords extending transversely of the fuselage,
   with the forwardmost wing section being located forwardly of, and above the level of, the center of gravity of the aircraft,
   and with the rearwardmost wing section being located rearwardly of, and below the level of, the aircraft center of gravity,
   said wing sections, on either side of the aircraft, being uniformly spaced apart longitudinally of the fuselage,
   with those of said wing sections positioned rearwardly of said forwarrdmost wing section, on either side of the aircraft, being disposed at a level below the level of the wing section immediately forward of same, and being spaced uniformly from same longitudinally of the fuselage a distance in the range of from approximately one half wing chord to approximately one wing chord, to be substantially free of the slipstream thereof along the length of same and draw air from the trailing edge thereof, along the length of same, thereby straightening out forward wing trailing edge vortices for making the total wing lift of said wing sections in excess of that possible for said wing sections if functioning in air flight independently of each other,
   said wing sections, on either side of the air craft, having their projecting ends connected by vertically disposed air foils,
   said air foils being disposed in vertical planes that parallel the longitudinal axis of the fuselage,
   whereby wing tip vortices are reduced,
   each of the trailing edges of said air foils having a rudder pivotally connected thereto to pivot about vertically disposed axes,
   said wing sections each including on either side of the fuselage, and along the trailing edges of same, an eleflap mounted to pivot about an axis paralleling the respective wing sections,
   means for moving said eleflaps in unison in the same direction about their respective axes to increase and decrease wing section lifts for effecting vertical movement of the aircraft free of substantial departure from level flight,
   and means for moving said rudders in unison in the same direction about their respective axes to steer the aircraft.

2. The improvement set forth in claim 1 wherein: the fuselage is free of a tail assembly.

3. The improvement set forth in claim 1 wherein: said air foils have substantial portions of same aligned with the aircraft center of gravity, longitudinally of the aircraft.

4. The improvement set forth in claim 1 wherein: said wing sections are two in number and have spans approximating the length of the fuselage.

5. The improvement set forth in claim 1 wherein: said wing sections are three in number and have spans of less length than that of the fuselage.

6. The improvement set forth in claim 1 wherein: the rearwardmost wing section is disposed rearwardly of the forwardmost wing section a distance of approximately one chord.

7. The improvement set forth in claim 1 wherein: said moving means includes means for moving the eleflaps of the wing sections positioned rearwardly of said forwardmost wing section, on either side of the aircraft, a fraction of the movement of the eleflaps of the forwardmost wing section that is inversely proportional to the distance of the respective rearward wing section eleflaps rearwardly of the aircraft center of gravity.

8. The improvement set forth in claim 1 wherein: the rearwardmost wing section is adjacent the level of the fuselage nose.

9. The improvement set forth in claim 1 wherein: the fuselage defines an operator's station forwardly of the aircraft center of gravity, and the fuselage baggage compartment is adjacent the aircraft center of gravity.

10. In an aircraft including a fuselage having a wing structure and power means for propelling same, the improvement wherein:
    the fuselage is free of a tail assembly, and said wing structure comprises:
    a plurality of wing sections of substantially equal lengths extending transversely of the fuselage,
    with the forwardmost wing section being located forwardly of, and above the level of, the center of gravity of the aircraft,
    and with the rearwardmost wing section being located rearwardly of, and below the level of, the aircraft center of gravity,
    said wing sections, on either side of the aircraft, being in substantial parallelism and being uniformly spaced apart longitudinally of the fuselage,
    with those of said wing sections positioned rearwardly of said forwardmost wing section, on either side of the aircraft, being disposed at a level below the level of the wing section immediately forward of same, and being spaced uniformly from same longitudinally of the fuselage a distance in the range of from approximately one half wing chord to approximately one wing chord, to be substantially free of the slipstream thereof along the length of same and draw air from the trailing edge thereof, along the length of same, thereby straightening out forward wing trailing edge vortices for making the total wing lift of said wing sections in excess of that possible for said wing sections if functioning in air flight independently of each other, said wing sections, on either side of the aircraft, having their projecting ends connected by vertically disposed air foils, said air foils being disposed in vertical planes that parallel the longitudinal axis of the fuselage, whereby wing tip vortices are reduced, each of the trailing edges of said air foils having a rudder pivotally connected thereto to pivot about vertically disposed axes, said wing sections each including on either side of the fuselage, and along the trailing edges of same, an eleflap mounted to pivot about an axis paralleling the respective wing sections, means for moving said eleflaps in unison in the same direction about their respective axes to increase and decrease wing section lift for effecting vertical movement of the aircraft free of substantial departure from level flight, and means for moving said rudders in unison in the same direction about their respective axes to steer the aircraft.

11. The improvement set forth in claim 10 wherein: said power means is of the pusher type.

12. The improvement set forth in claim 10 wherein: said air foils have substantial portions of same aligned with the aircraft center of gravity, longitudinally of the aircraft.

13. In an aircraft including a fuselage having a wing structure and power means for propelling same, the improvement wherein:

said wing structure comprises:

a plurality of wing sections extending transversely of the fuselage and spaced apart longitudinally of the fuselage, with the forwardmost wing section being located forwardly of and above the level of, the center of gravity of the aircraft, and with the rearwardmost wing section being located rearwardly of, and below the level of, the aircraft center of gravity, said wing sections, on either side of the aircraft, having their projecting ends connected by a vertically disposed air foils, with those of said wing sections positioned rearwardly of said forwardmost wing section, on either side of the aircraft, being disposed at a level below the level of the wing section immediately forward of same to be free of the slipstream thereof along the length of same and draw air from the trailing edge thereof, along the length of same, for making the total wing lift of said wing sections in excess of that possible for said wing sections if functioning in air flight independently of each other, said air foils being disposed in vertical planes that parallel the longitudinal axis of the fuselage, each of the trailing edges of said air foils having a rudder pivotally connected thereto to pivot about vertically disposed axes, said wing sections each including on either side of the fuselage, and along the trailing edges of same, an eleflap mounted to pivot about an axis paralleling the respective wing sections, means for moving said eleflaps in unison in the same direction about their respective axes to increase and decrease wing section lifts for effecting vertical movement of the aircraft free of substantial departure from level flight, and means for moving said rudders in unison in the same direction about their respective axes to steer the aircraft, said power means being of the pusher type and including motor means disposed in substantial vertical alignment with the aircraft center of gravity.

* * * * *